United States Patent
Vardelle et al.

(10) Patent No.: US 7,332,036 B2
(45) Date of Patent: *Feb. 19, 2008

(54) THERMAL PROJECTION DEVICE

(75) Inventors: Michel Vardelle, St-Just-le-Matel (FR); Thierry Renault, Minneapolis, MN (US); Cédric Bossoutrot, Lagraulière (FR); Frédéric Braillard, Chatellerault (FR); Hakim Hoffmann, Saint Etienne (FR)

(73) Assignee: Snecma Services, Paris (FR)

( * ) Notice: Subject to any disclaimer, the term of this patent is extended or adjusted under 35 U.S.C. 154(b) by 196 days.

This patent is subject to a terminal disclaimer.

(21) Appl. No.: 10/505,843

(22) PCT Filed: Feb. 28, 2003

(86) PCT No.: PCT/FR03/00648

§ 371 (c)(1),
(2), (4) Date: Aug. 27, 2004

(87) PCT Pub. No.: WO03/072291

PCT Pub. Date: Sep. 4, 2003

(65) Prior Publication Data

US 2005/0120952 A1 Jun. 9, 2005

(30) Foreign Application Priority Data

Feb. 28, 2002 (FR) ................................. 02 02526

(51) Int. Cl.
*B05C 11/10* (2006.01)

(52) U.S. Cl. ........................ 118/664; 118/665; 118/667; 118/666; 118/688; 239/75; 427/8; 427/9; 427/427.2

(58) Field of Classification Search ................ 118/664, 118/665, 666, 667, 688, 712, 713; 700/123, 700/124, 125; 239/75; 427/8, 9, 427.2
See application file for complete search history.

(56) References Cited

U.S. PATENT DOCUMENTS 5,912,471 A * 6/1999 Schutz ..................... 250/559.4

(Continued)

FOREIGN PATENT DOCUMENTS

EP 1065484 A2 * 6/2000

(Continued)

OTHER PUBLICATIONS

S.B. Chen et al., *Intelligent Methodology for Sensing, Modeling and Control of Pulsed GTAW: Part 1—Bead-on-Plate Welding*, Welding Research Supplement, Jun. 2000, pp. 151s-163s, XP-000954653.

(Continued)

*Primary Examiner*—George Koch
(74) *Attorney, Agent, or Firm*—Rothwell, Figg, Ernst & Manbeck, PC

(57) ABSTRACT

The invention relates to a device and a method for control of the operation of a thermal projection torch (12), characterized in that the characteristics of the jet (16) and the temperature of the deposit (24) on the piece (22) are measured by means of a camera (54) and a combined pyrometer (70). The correction to be made to the supply parameters of the torch (12) are deduced therefrom and the corrected parameters are transmitted to the unit (30) controlling the torch (12).

20 Claims, 4 Drawing Sheets

U.S. PATENT DOCUMENTS

RE36,926 E       10/2000   Austin et al.
6,640,878 B2 *   11/2003   Allor et al. .............. 164/150.1
6,967,304 B2 *   11/2005   Gevelber et al. ...... 219/121.47

FOREIGN PATENT DOCUMENTS

GB          2327493 A   *   6/1998
JP            03018484         1/1991
JP            10153554         6/1998

OTHER PUBLICATIONS

C. Doumanidis et al., *Distributed-Parameter Control of the Heat Source Trajectory in Thermal Materials Processing*, Journal of Manufacturing Science Engineering, Nov. 1996, pp. 571-578, vol. 118, XP-000635785.

* cited by examiner

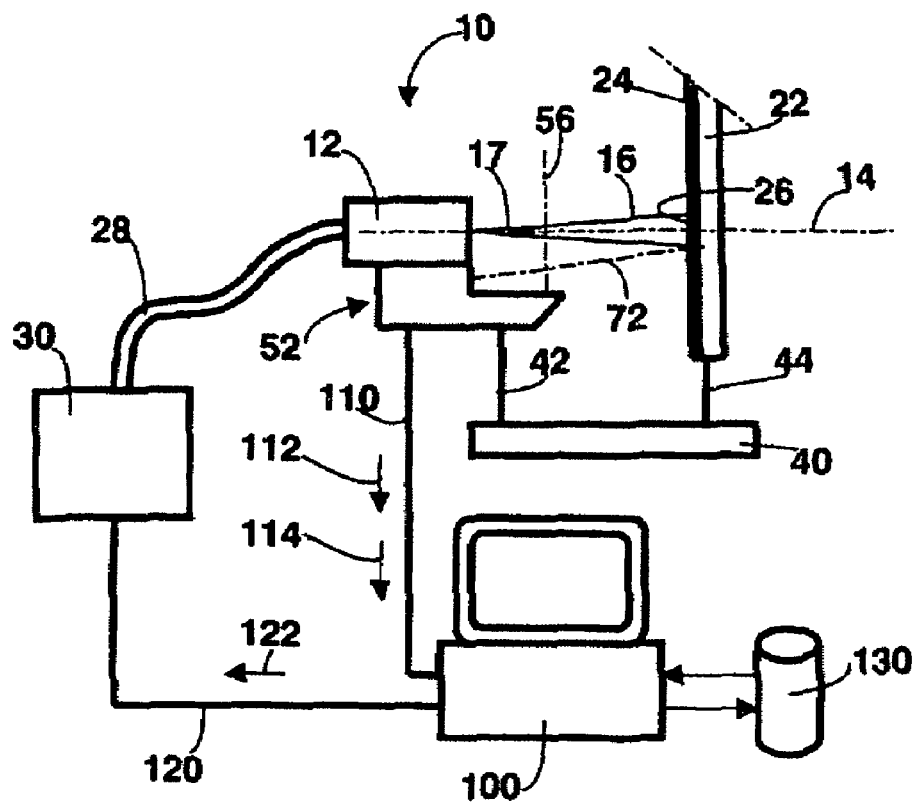
Fig : 1
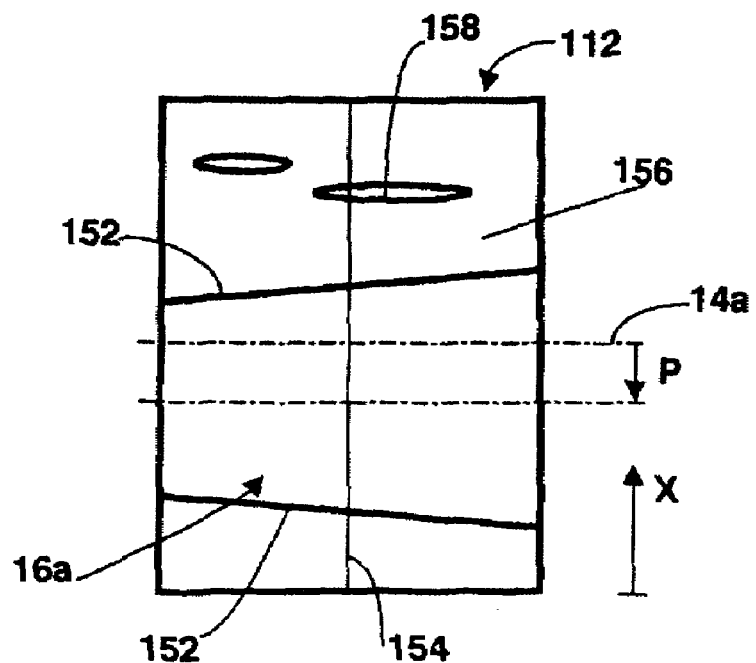
Fig : 6

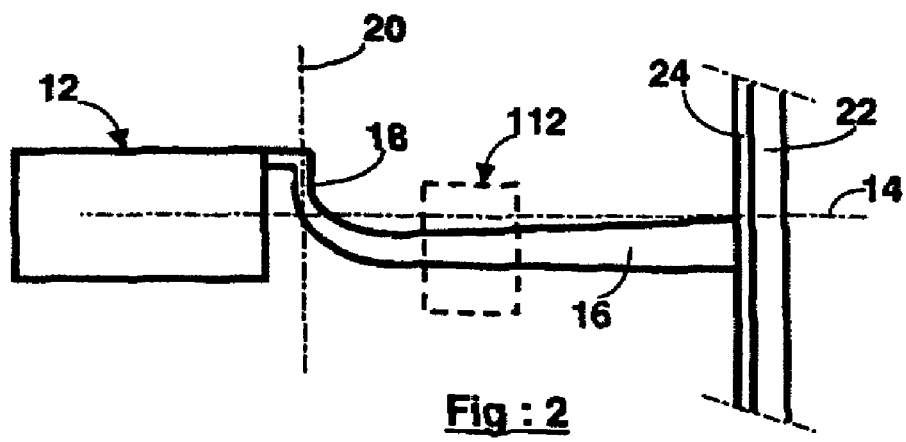
Fig : 2
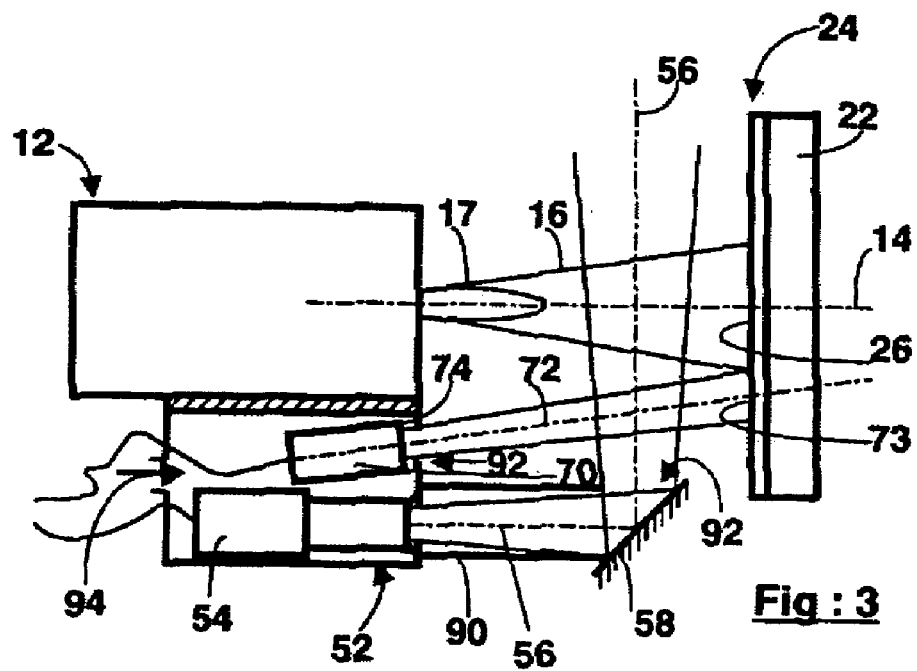
Fig : 3
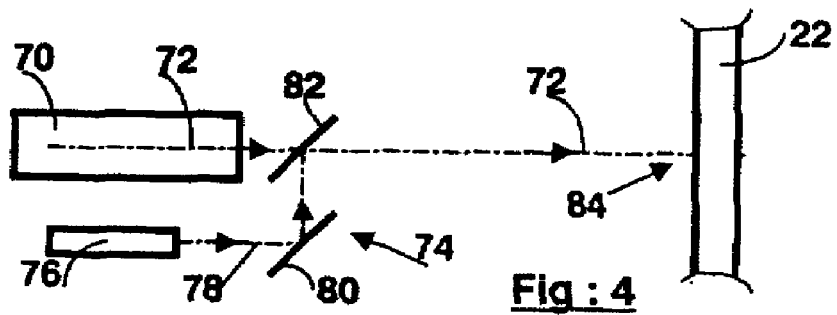
Fig : 4

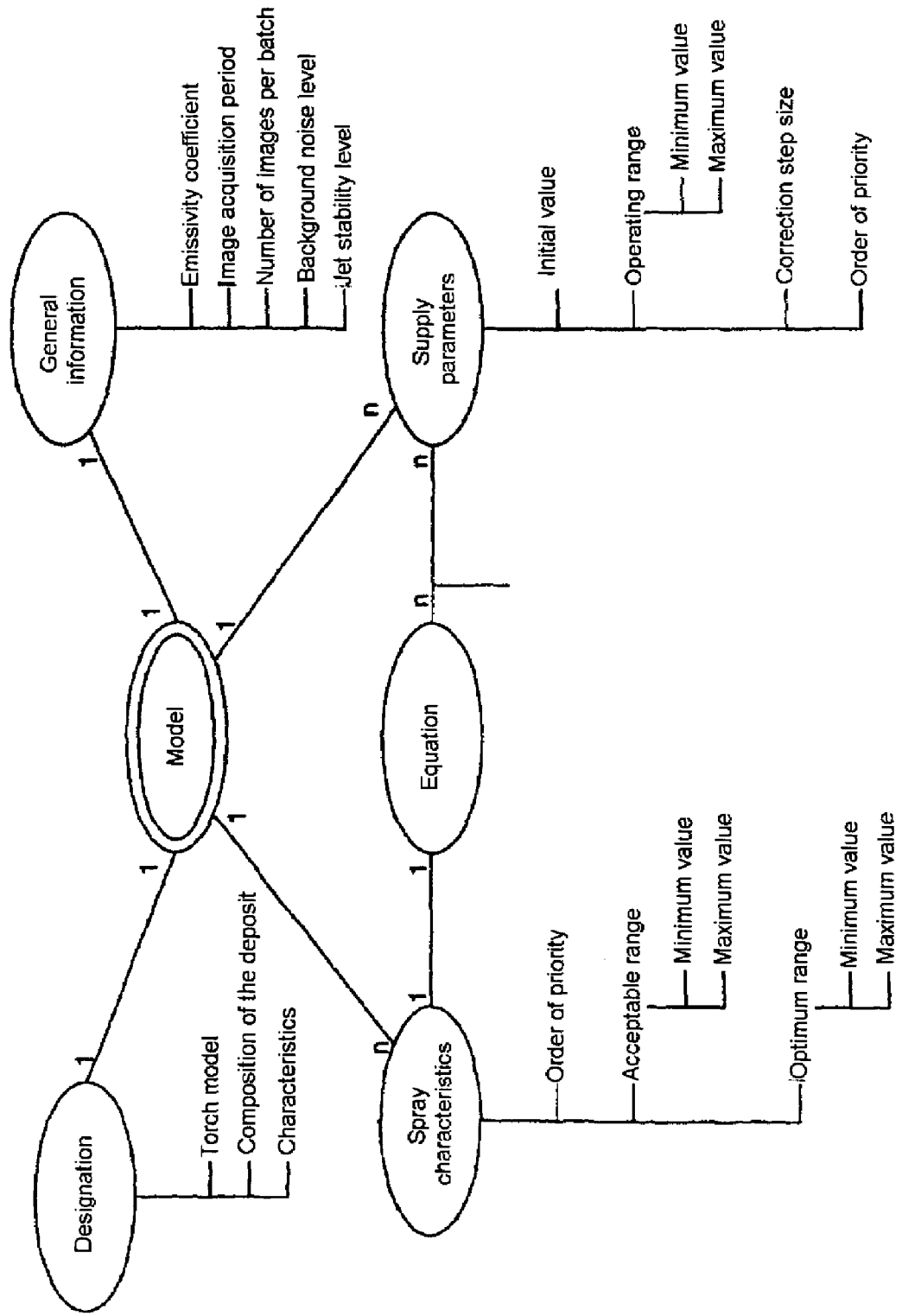
Fig : 5

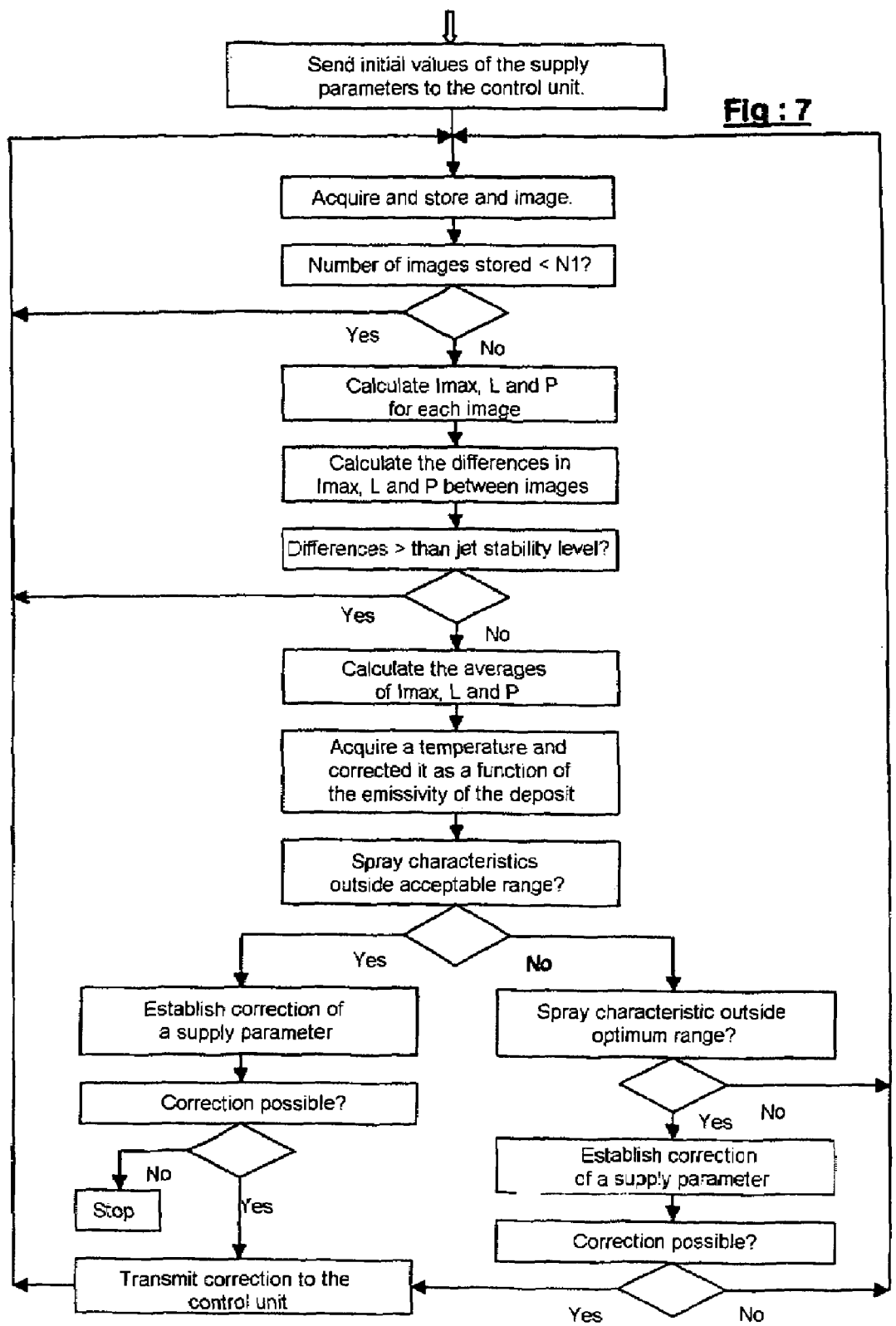

THERMAL PROJECTION DEVICE

CROSS REFERENCE TO RELATED APPLICATIONS

This application is a 371 of PCT International Application Number PCT/FR03/00648, filed on Feb. 28, 2003.

TECHNICAL FIELD OF THE INVENTION

The invention relates to the coating of surfaces by thermally spraying molten materials with the aid of a thermal spray torch, referred to below as a torch, and more particularly to a thermal spray instrument which has a device for monitoring and managing the thermal spraying.

PRIOR ART AND OBJECT

Thermal spraying is a well-known method for coating a solid surface with a material which has a high melting point. It consists in melting the material in a high-speed hot gas flow directed onto the surface, with the gas flow atomizing the material as small molten droplets and entraining the droplets to the surface, the droplets still in the molten state being flattened onto the surface, the droplets adhering to the surface and solidifying in contact with it. The gas flow loaded with molten droplets is referred to as a jet. The coating is obtained by successive passes by moving the jet with respect to the surface.

Thermal spraying can be used for various purposes: decoration, thermal barriers, protection against oxidation or chemical corrosion, reapplying materials, enhancing mechanical characteristics of the surface, in particular abrasion resistance, etc.

The spray material may be a pure metal such as molybdenum or titanium, a metal alloy such as NiCr, NiAl, NiCrAlY, a ceramic such as $Cr_2O_3$ or $ZrO_2$, a carbide such as WC or $Cr_3C_2$, or a cermet such as $Cr_3C_2$/NiCr.

Various methods of thermal spraying are known, each of which uses a particular torch.

So-called "flame" thermal spraying consists in producing a flame by the combustion of gases with a high calorific value, such as acetylene and oxygen, the rise in temperature producing a high-speed gas stream into which the material to be sprayed is injected in the form of powder or wire. The material melts in contact with the flame, is atomized as small molten droplets in the flow of hot combustion gases and is entrained by this flow in order to form the jet.

So-called "arc wire" thermal spraying consists in producing an electric arc between two wires of the material to be sprayed, and in passing a flow of neutral gas, such as argon Ar, onto the electric arc at a high speed. The material of the wires liquefies in the presence of the electric arc, is atomized as small molten droplets in the flow of hot combustion gases and is entrained by this flow in order to form the jet.

So-called "arc plasma" thermal spraying consists in producing heat by sustaining an electric arc in a flow of plasma-generating gas, with the plasma formation leading to a significant rise in the temperature of the gas, and in the powder material to be sprayed being injected into this flow, this powder being fluidized and transported by an inert so-called "carrier" gas. The combination consisting of the plasma-generating gas, the carrier gas and the material melted as fine droplets in contact with the plasma-generating gas forms the jet.

The jet has the form of a divergent cone at the outlet of the torch. Because of the high temperatures involved, a torch degrades progressively as it is used, this degradation leading to drifts in its operation as well as deformations and deviations of the jet. In certain types of arc plasma torch, the powder injection takes place transversely to the plasma-generating gas flow at the outlet of the torch, which leads to a normal deviation of the jet.

The torch is conventionally small so that it can be moved conveniently in front of the surface to be covered. This torch is connected to a control unit which supplies it with electric current and the various ingredients needed for its operation. The term ingredients is intended to mean the gases and the materials as described above.

The quality criteria of a deposit formed by thermal spraying are conventionally its hardness, its adhesion at the coated surface, its porosity, the absence of cracks, the unmolten fraction and, in the case of metallic materials, its oxide level. The term "unmolten fraction" is intended to mean the proportion of the material constituting the deposit which has not passed through the molten state. Attention is also paid to the efficiency of the spraying, that is to say the proportion of the material used which will actually constitute the deposit, the rest of material being lost on the walls around the thermal spray installation.

The quality of the deposit and the efficiency of the depositing operation clearly depend not only on the material employed but also on the settings and type of the torch. The material flow rate, for example in grams per minute, is clearly a parameter common to all the torches. In the case of flame spraying, it is also necessary to set the flow rates of combustible and oxidant gases expressed, for example, in liters per minute. In the case of arc wire spraying, it is also necessary to set the arc intensity in amperes and the gas flow rate. In the case of arc plasma spraying, it is also necessary to set the arc intensity, the flow rate of plasma-generating gas and the flow rate of carrier gas.

It is difficult to obtain a constant deposition quality because the torch and its supply of ingredients are subject to inaccuracies and drifts over time, which clearly affect this quality. Before coating operations are carried out, it is necessary to test the torch on samples and adjust the settings if so required. But this is not enough. During the coating operations, it is also necessary to carry out checks periodically on the basis of samples and modify the settings, or change the torch if so required. This is because a torch degrades progressively as it is used, especially in its hot parts such as the injection nozzle, and these degradations can make the characteristics of the torch drift and make the jet deform or become displaced. These checks should be frequent so that the appearance of a drift can be detected early enough and the settings of the torch can be modified before the quality of the deposit has itself drifted outside the acceptable limits. These checks and these adjustments clearly take time and reduce the productivity of the installation. In the case of prolonged coating operations, it may furthermore be necessary to interrupt it in order to check the torch or the quality of the deposit and, if need be, change the setting of the torch or replace it.

A first object to be achieved is to verify that the torch is capable of providing a deposit whose characteristics comply with what was intended, this verification necessarily having to be carried out in realtime during a thermal spraying operation, and also to correct the operation of this torch in realtime when drifts are found.

A second object is to achieve these results by inexpensive means.

A third object is to stop the torch automatically when it is no longer capable of operating normally and consequently runs the risk of producing defective coatings.

DESCRIPTION OF THE INVENTION

In order to achieve this object, the invention provides a thermal spray instrument having a thermal spray torch, the torch being capable of spraying a jet along its geometrical axis, the jet consisting of a gas flow at elevated temperature loaded with molten particles of the material to be sprayed, the instrument having a control unit supplying the torch with ingredients by applying the supply parameters which are communicated to it, the instrument having a computer communicating the supply parameters to the control unit by means of a unit-computer connection, the instrument having sensors capable of monitoring the movements of the torch, the sensors being capable of transmitting information about the operation of the torch to the computer, this transmission being carried out by means of the sensors-computer connection.

Such an instrument is noteworthy in that:

a. the computer has software for realtime analysis of the information, in order to repetitively deduce therefrom the measurement of at least one so-called "spray" parameter so as to find when this measurement is stabilized, in order to "process" this spray characteristic, that is to say in order to calculate a new supply parameter value and transmit it to the control unit when the measured value of the spray characteristic is outside a preestablished so-called "acceptable" range of values specific to the spray characteristic being processed, this new value of the supply parameter being suitable for returning the spray characteristic to its acceptable range.

b. the sensors have an optical pyrometer capable of remotely measuring the thermal radiation at the surface of some article to be coated, which is positioned in front of the torch, the pyrometer having a narrow field, the pyrometer being positioned so that the field comes as close as possible to the jet (16) on the article, but without interfering with this jet, the pyrometer also being capable of periodically transmitting the temperature measurement to the computer by means of the sensors-computer connection.

c. the computer is capable of correcting the temperature measurement as a function of the emissivity coefficient of the coating, this corrected temperature called deposite temperature T constituting the spray characteristic.

Such an instrument makes it possible to effectively regulate the residual stresses of the deposit, because these residual stresses have been found to depend strongly on the temperature T of the deposit.

Advantageously:

d. the sensors have a camera capable of periodically providing the computer with the information in the form of digital images of the jet as seen in profile over a part of its length, e. the computer also measures from the image and processes the width L of the jet, L also constituting a spray characteristic, an order of priority being defined in the processing of the spray characteristics, the processing of the temperature being given priority however, the camera being capable of observing the jet with a resolution at least equal to 0.5 mmm, L being proportional to the standard deviation of the distribution of the luminance of the jet along a geometrical line transverse to the jet.

Such an instrument makes it possible also to regulate the hardness of the coating, because this hardness has been found to depend strongly on the width L of the jet.

Also advantageously:

d. the sensors have a camera capable of periodically providing the computer with the information in the form of digital images of the jet as seen in profile over a part of its length, e. the computer also measures from the image and processes the position P of the jet, P also constituting a spray characteristic, an order of priority being defined in the processing of the spray characteristics, the processing of the temperature T still being given the highest priority, the camera being capable of observing the jet with a resolution at least equal to 0.5 mmm, P being, within a constant value $P_O$, the mean value of the distribution of the luminent of the jet along a geometrical line transverse to the jet.

Such an instrument makes is possible also to regulate the level of cracks of the coating, because it has been observed that this level of cracks depends strongly on the position P of the jet.

Also advantageously:

d. the sensors have a camera capable of periodically providing the computer with the information in the form of digital images of the jet as seen in profile over a part of its length, e. the computer measures from the image and processes the maximum luminance $I_{max}$ of the jet, $I_{max}$ also constituting a spray characteristic, an order of priority being defined in the processing of the spray characteristics, the processing of the temperature T still being given the highest priority.

Such an instrument makes is possible also to regulate the level of oxides of the coating, because this level of oxides has been found to depend strongly on the maximum luminance $I_{max}$ of the jet.

The camera will advantageously be of the CCD type, the effect of the charge accumulation in the pixels of the matrix being to filter the high-frequency vibrations of the jet, the result of which is to improve the estimate of the characteristics of the jet, and consequently to regulate the thermal spraying better. The measurements may be carried out simply in the visible light spectrum. In the case of applications which require very good regulation of manufacturing processes, for example in the aeronautical and space industries, a camera giving images of the jet with a resolution at least equal to 0.1 mm will be selected in order to improve the regulation of the spray characteristics, and consequently the characteristics of the deposits which are formed.

The camera, the pyrometer and the computing means employed are readily available on the market and inexpensive, so that the second object is achieved.

The invention will be understood more clearly and the advantages which it offers will become more readily apparent on studying the following detailed description of some numerical exemplary embodiments and the appended figures.

DESCRIPTION OF THE FIGURES

FIG. 1 schematically represents a thermal spray installation.

FIG. 2 illustrates an arc plasma thermal spray torch with transverse injection of the powder material to be deposited, the jet being seen along the geometrical axis referenced 56 in FIG. 1.

FIG. 3 illustrates the onboard sensors with the CCD camera and the optical pyrometer.

FIG. 4 illustrates the optical pyrometer and its sight.

FIG. 5 gives an example of a relational diagram of the information of the database.

FIG. 6 illustrates the images which are processed by the computer.

FIG. 7 gives a synthetic example of an algorithm for performing the functions of the computer.

DETAILED DESCRIPTION

An installation of the thermal spray type, and the monitoring device which is associated with it according to the invention, will be described first of all.

Reference will firstly be made to FIG. 1. The thermal spray instrument 10 has a thermal spray torch 12 of geometrical axis 14 which sprays a jet 16 along this geometrical axis 14, consisting of a hot gas flow loaded with droplets of the molten material to be sprayed: metal, metal alloy, ceramic or cermet. The jet 16 is divergent and is conventionally in the form of an axisymmetric cone centered on the geometrical axis 14. A very bright flame 17 sometimes emerges from the torch 12 in the vicinity of the apex of the cone formed by the jet 16. In the case of plasma torches, this flame 17 may reach a temperature of 8000.degree. K. The jet is still bright beyond this flame 17, but this luminosity is now due essentially only to the droplets of molten material. The jet 16 is normally centered on the geometrical axis 14. Because of the high temperatures employed in the torch 12, and in spite of the cooling devices integrated in these torches 12, the torches 12 degrade particularly by erosion during their use, and these degradations can modify the characteristics of the jet 16, deform the jet 16 or make the geometrical axis 14 deviate.

Reference will now be made to both FIGS. 1 and 2. The torch 12 is an arc plasma torch of the type using transverse injection and has an injector with a geometrical axis 20 perpendicular to the geometrical axis 14 of the torch, the powder material to be sprayed being injected into the jet 16 by this injector 18 with the aid of a so-called carrier gas, this injection taking place just at the outlet of the torch 12 in the vicinity of the apex of the cone formed by the jet 16, this injection taking place transversely to the jet 16 and leading to a deviation of the jet 16 in the opposite direction to the injector 18, the jet 16 then moving away normally from the geometrical axis 14.

The droplets of molten material sprayed by the jet 16 arrive at a high speed and are flattened onto the surface of the article 22 to be covered, in order to form the intended deposit 24 there by solidification and adhesion. This deposit 24 normally consists of successive layers, with the torch 12 sweeping repeatedly over the surface of the article 22. The surface of the article 22 exposed to the jet 16 at a given time will be referenced 26.

The thermal spray instrument 10 also has a conduit 28 and a control unit 30, this control unit 30 supplying the torch 12 with ingredients by means of the conduit 28, the supply consisting in providing the torch 12 with the ingredients required for it to operate. The flow rates of these ingredients will be referred to as "supply parameters".

In the case of an arc plasma torch, the essential supply parameters of the torch are:
- the electric arc current I and the voltage V which results therefrom;
- the flow rate of each plasma-generating gas, such as hydrogen $H_2$ and argon Ar, expressed for example in liters per minute, the liters being considered at atmospheric pressure;
- the material flow rate Dm, expressed for example in grams per minute;
- the carrier gas flow rate, also expressed for example in liters per minute, this gas usually being argon and being denoted $Ar_{carrier}$;

The torch 12 is cooled by circulation of water.

The torch may be hand-held, for example in order to repair civil engineering structures made of metal. It is most often used on a preferably robotized installation 40 which holds, positions and moves the torch 12 relative to the article 22 to be processed. The installation 40 will preferably have a robot arm 42 supporting the torch 12, as well as a fixed or pivoting article holder 44 which holds the article 22 in front of the torch 12.

Reference will now be made to FIG. 3. According to the invention, the spray instrument 10 has onboard sensors 52 attached to the torch 12 so as to monitor it in its movements during the thermal spraying, these onboard sensors 52 thus remaining in a constant relative position with respect to the torch 12.

The onboard sensors 52 firstly consist of a CCD camera 54 which can provide digital images of the jet 16, these being taken transversely or perpendicularly to this jet 16. When the jet 16 has a flame 17 at its start, the camera 54 is positioned in order to provide an image of the jet 16 beyond the flame 17, that is to say downstream of this flame 17, so that the image of the jet 16 is not obscured by the light of the flame 17. The geometrical imaging axis of the camera 54 will be referenced 56. Preferably, but not necessarily, the camera 54 is arranged beside the torch 12 and sights the jet 16 by means of an imaging mirror 58 arranged at 45° in front of the camera 54, this imaging mirror 58 deviating the geometrical axis 56 of the CCD camera by 90° and allowing the CCD camera 54 to see the jet 16.

Such an arrangement thus makes it possible to free the space between the torch 12 and the article 22 as much as possible.

The camera should have a sufficient resolution to be able to pick up 0.5 mm details on the jet 16. This is because such a resolution is necessary in order to detect and measure a 0.5 mm deviation of the jet. In the case of aeronautical applications, this resolution should actually be at least equal to 0.1 mm in order to regulate the characteristics of the deposit with a sufficient precision. In this example, the camera has a CCD (Charge Coupled Device) matrix of 640×480 pixels with an exposure time ranging from $\frac{1}{30}$ second to $\frac{1}{2000}$ second in order to observe jets of very different light intensity with a sufficient precision and without saturating the pixels of the matrix. The sensitivity of the CCD camera may be limited to the visible spectrum. A black-and-white camera is sufficient, although it is also possible to use a color camera. Such a camera is readily available on the market at a low price. It is sufficient for it to have adequate stability against the heat released during the thermal spraying.

In the event that the torch 12 has an injector 18 for powder material to be sprayed, the camera 54 is positioned in order to see the jet 16 along a geometrical axis 56 substantially orthogonal to the geometrical axis 20 of the injector 18, this position making it possible to optimally visualize the deviation of the jet 16 due to this injection mode, this position consequently making it possible to monitor the deviation of the jet 16 more effectively.

Compared with conventional acquisition devices such as a linear array of photodiodes, the CCD camera has the following advantages.

Smoothing of the high-frequency vibrations of the jet, which is obtained by the effect of charge accumulation in the pixels of the CCD matrix, this accumulation taking place in proportion to the light which they receive, with vitiation of the measurements and the introduction of instabilities into the management of the torch being avoided by this smoothing. Specifically, the sensors integrate the light received during the exposure time, so that the variations in the luminance of the jet 16 due to these vibrations are divided by the ratio d/t, d being the exposure time and t being the period of the vibrations of the jet. In a conventional device, it would have been necessary to provide lowpass electronic filters on each of the photosensitive elements, which would increase their bulk and limit the number of them.

High resolution in a small volume, namely a few cubic centimeters.

Inexpensive device making it possible to take the images and transmit them to the computer by standard commercially available means.

The onboard sensors 52 also consist of an optical pyrometer 70 with a geometrical axis 72, which remotely measures the thermal radiation emitted by a so-called "measurement" surface 73, the measurement surface 73 having small dimensions along the geometrical axis 72. The pyrometer 70 is directional and it can be aimed at the article 22 as close as possible to the spraying zone 26 but without interfering with this spraying zone 26, that is to say the measurement zone 73 is close or adjacent to the spraying zone 26 but does not interfere with this spraying zone 26. In other words, the pyrometer 70 has a narrow field and it is positioned so that the field comes as close as possible to the jet 16 on the article 22, but without interfering with this jet 16. With this arrangement, the very bright jet 16 remains outside the field of the pyrometer, and in particular the measurement zone 73, so that the pyrometer 70 receives the thermal radiation of the deposit 24 but not the light radiation of the jet 16, which could vitiate the measurement of the temperature of the deposit. In order to facilitate positioning of the pyrometer 70, it preferably has a laser sight 74 projecting a light spot onto the measurement zone 73.

The measurement of the thermal radiation is conventionally taken in the infrared range, that is to say in the electromagnetic radiation band extending from 0.8 μm to 14 μm. In the particular case of arc plasma torches, this will preferably be done in the 8 μm-14 μm band in order to obtain a stable, precise and inexpensive measurement. This is because it has been found that with this type of torch, ionization of the water vapor $H_2O$ and the carbon dioxide gas $CO_2$ contained in the air takes place in the vicinity of the jet 16, this ionization leading to absorption of the infrared radiation in the 0.8 μm-3.46 μm and 4.78 μm-8 μm bands for water vapor and in the 4.2 μm-4.5 μm band for carbon dioxide gas. It has been found that temperature measurements taken without excluding these absorption bands are unstable and affected by background noise which makes them difficult to use. It is therefore preferable to take the measurement in the 8 μm-14 μm band, this band being wide enough so that the pyrometer 70 can be equipped with an inexpensive filter. It is also possible to take this measurement in the 3.46 μm-4.2 μm or 4.5 μm-4.78 μm bands, but these are narrow and it is then necessary to equip the pyrometer 70 with high-performance and therefore expensive narrowband filters.

An example of a sight 74 is illustrated in FIG. 4. The sight 74 projects a narrow laser beam 78 along the geometrical axis 72 of the pyrometer 70. To this end, the sight has a diode laser 76 arranged beside the pyrometer 70, the diode laser 76 emitting a laser beam 78 forward from the pyrometer 70, parallel to its geometrical axis 72, the laser beam 78 being brought into the geometrical axis of the pyrometer 72 by a conventional set of two mirrors 80 and 82, the second mirror 82 being semi-reflective and positioned along the geometrical axis of the pyrometer 72. With such an arrangement, the setting of the sight does not depend on the distance between the pyrometer 70 and the surface of the article whose temperature is to be measured.

It will be noted that the pyrometer 70 gives an exact measurement of the temperature only for perfect black bodies. In reality, it is necessary to take into account the emissivity coefficient E of the material whose temperature is being measured, this emissivity coefficient E lying between 0 and 1, the real temperature T being related to the temperature $T_{obs}$ observed by the pyrometer by the following relation:

$$T \approx C/\lambda.[ln(E)+C/\lambda.T_{obs}]-273 \text{ with } C=0.00144$$

$T_{obs}$ being the absolute temperature expressed in degrees Kelvin and T being expressed in degrees Celsius for convenience.

The measured temperature can thus be calculated by analog or digital means.

Reference will again be made to FIG. 3. The onboard sensors 52 are arranged inside a closed compartment 90 which protects them against external agents, although this compartment 90 does have openings 92 allowing the camera 54 to see the jet 16 and allowing the pyrometer 70 to see the surface of the article 22, this compartment 90 having a compressed air supply 94, this compressed air emerging through openings 92 and forming an obstacle to the ingress of dust and droplets into the compartment during operation of the torch 12, such dust and droplets being liable to deposit on the sensors 52 and in particular foul their optical components.

Reference will again be made to FIG. 1. The thermal spray instrument 10 also has a computer 100 connected by the connection 110 to the onboard sensors 52, that is to say to the camera 54 and to the pyrometer 70. By means of this connection 110, the computer 100 is capable of receiving in realtime the digital images 112 coming from the camera 54, as well as the temperature readings 114 coming from the pyrometer 70. The computer 100 is also connected to the control unit 30 by means of the connection 120. By means of this connection 120, the computer 100 is capable of transmitting the supply parameters to the control unit 30 in realtime. Also by means of this connection 120, the computer is capable of receiving the supply parameters from the control unit 30 in realtime, for example the voltage V of the arc in the case of a plasma torch. The term "realtime" is intended to mean the value of the information to be applied as soon as it is received, or the current value of the information which will be transmitted. The computer 100 may be a commercially available microcomputer equipped with suitable connection means so that it can be connected to the connections 110 and 120 respectively leading to the sensors 52 and to the control unit 30, this computer 100 also needing to have enough power to perform the processing operations at the appropriate frequency.

Reference will now be made to FIG. 5. The computer 100 also has a database 130 containing the information needed in order to monitor and manage the thermal spraying. In this example, the information is grouped as models, each model providing the information required in order to manage a depositing operation by thermal spraying with a torch, a deposit composition and specified deposit characteristics.

The model firstly contains the information designating it, that is to say:
- the torch model being used;
- the deposit composition to be formed;
- the deposit characteristics to be obtained;

this information making it possible to designate it unequivocally and select the appropriate model from the database, for example by a simple multicriterion search.

The model contains general information:
- emissivity coefficient for calculating the exact temperature from the measurement given by the pyrometer;
- image acquisition period of the CCD camera;
- Number of images per batch;
- Background noise level;
- Stability threshold level of the jet.

A model contains the spray characteristics which are to be taken into account and which need to be managed, namely:
- $I_{max}$: maximum luminance of the jet;
- L: width of the jet;
- P: position of the jet;
- T: temperature of the deposit.

For each of these spray characteristics, the model also contains:
- an order of priority;
- a so-called "acceptable" range defined by a minimum value and a maximum value;
- and a so-called "optimum" range also defined by a minimum value and a maximum value, the optimum range obviously being included within the acceptable range of the corresponding spray characteristic.

The model contains the supply parameters which need to be altered in order to manage the spray characteristics. These parameters clearly vary with the torture model being used. For example, in the case of a plasma torch:
- I: Arc intensity;
- Ar: flow rate of plasma-generating argon;
- $H_2$: flow rate of plasma-generating hydrogen;
- $Ar_{carrier}$: flow rate of carrier argon.

For each supply parameter, the model contains:
- an initial value to be transmitted to the control unit when a thermal spraying operation is being started;
- an order of priority by being applied uniformly by default to the supply parameter for all the spray characteristics on which it has an effect.
- a normal operating range of the torch, expressed by a minimum value and a maximum value, this range optionally also expressing the validity limits of the equation,
- a correction step size, It should be noted that in certain more complex cases, the order of priority and the normal operating range should be specified for each equation involving the supply parameter in question.

Lastly, the model gives the statistical relations between the spray characteristics and the supply parameters of the torch in the form of a system of equations, each equation of which is a polynomial of the form:

spray characteristics=$F$(supply parameter)

=$K+\Sigma_i c_i p_i + \Sigma_{jk} c_{jk} p_j p_k$ in which:
- K is a positive or negative constant;
- $c_i$ is a positive or negative coefficient associated with the supply parameter i;
- $p_i$ is the current value of the supply parameter i;
- $c_{jk}$ is a positive or negative coefficient associated with the product of two supply parameters j and k.

In practice, each polynomial is linear and sometimes of degree 2. Higher degrees are conceivable, but it then becomes difficult to estimate the relations and the degree of dependence between the spray characteristics and the supply parameters.

These relations are clearly statistical, and moreover established by laboratory studies. They are valid, with an acceptable dispersion, only within a range of values that are specified for each supply parameter. For instance, the so-called "normal operating" range may correspond:
- either to limitations of the torch;
- or to limitations of the validity of the equation corresponding to a degree of dependence deemed acceptable between the spray characteristic in question and the supply parameters on which it depends.

Preferably.
- The order of the equations gives the order of priority in which the spray characteristics should be corrected.
- The order of the supply parameters in each equation gives the order of priority in which it is necessary to modify the supply parameters in order to correct the corresponding spray characteristic.

We will now define the spray characteristics more precisely, and reference will be made to both FIGS. 1 and 5.

The maximum intensity $I_{max}$ of the jet is the maximum luminance of the jet 16, this maximum luminance of the jet conventionally being at the center of the jet 16 as seen laterally from the outside and downstream of any flame 17 which may emerge from the torch 12. The luminance is a physical quantity which can be expressed in watts per square meter per steradian ($W/m^2/sr$). The maximum light level of the pixels of the points 112 as given by the matrix of the CCD camera 54 will preferably be adopted. This light level is common to the known image standards such as a bitmap, GIF, PSD, etc. It is conventionally encoded over eight bits and consequently scales from zero to 255. If the CCD camera 54 being used provides color images, that is to say in red—green—blue additive trichromicity, then the maximum light level of the color green may simply, but not necessarily, be adopted, this color green being the one most resembling the behavior of a black-and-white CCD camera.

The width L of the jet is a quantity selected in order to characterize the width of the jet 16. Since the edges of the jet 16 are disperse and not clearly defined, a quantity proportional to the standard deviation σ of the distribution of the luminance of the jet in the width direction of the jet will preferably be adopted. In practice, the standard deviation σ of the distribution of the light levels of the pixels over the image 112 of the jet in the width direction of the jet 16a on this image 112 will be adopted, for example along a row of pixels 154 perpendicular to the position 14a of the geometrical axis 14 of the torch on the image 112. For example, L=2σ expressed in millimeters will be adopted.

The position P of the jet is the position of the jet with respect to the geometrical axis 14 of the torch 12. Since the edges of the jet 16 are disperse and not clearly defined, P will preferably be the average of the distribution of the luminance of the jet, also in the width direction of the jet 16a on the image 112, for example and as before along a row of pixels 154 perpendicular to the position 14a of the geometrical axis 14 of the torch on the image 112.

It has been found that the distribution of the light levels of the pixels in the width direction of the jet 16a on its image 112 approximately follows the well-known Gaussian law in the form:

$$I = G(I_{max}, P, \sigma) = I_{max} \cdot \exp(-(x-(P+P_0))^2/\sigma^2)/2\pi, \text{ with:}$$

I=light level of the pixels in the width direction of the jet;
x=position of the pixel;
$P_0$=position 14a of the geometrical axis 14 of the torch on the image 112, this position 14a being found easily by fitting a rod in the nozzle of the torch 12 and by taking an image 112 of this rod.

It is consequently preferable to process this additional information and deduce Imax, P and σ from the estimate of the Gaussian law G of the distribution of the light levels of the pixels, as before in the width direction of the jet 16a on the image 112, and as before along a row of pixels 154 perpendicular to the position 14a of the geometrical axis 14 of the torch on the image 112, in which case this estimate may be obtained by the well-known so-called "least squares" method.

In order to reduce the effect of stray light and light reflections of all kinds around the thermal spray installation, this stray light being liable to cause a diffuse shadow 156 on the images 112, on either side of the image of the jet 16a, as well as bright spots 158 due to reflections, this shadow and these bright spots 156 being liable to non-repetitively vitiate the estimates of the characteristics of the jet, it is preferable to take into account only the pixels whose light level is higher than a threshold value referred to as the "background noise level". This threshold value is easy to determine by separately analyzing a few test images. In practice, it is equal to 4 or 5 on a scale ranging from zero to 255 for the light levels on the images 112.

The temperature T of the deposit is the temperature as measured by the pyrometer 70 and corrected as a function of the emissivity of the deposit.

The CCD camera should have a sufficient resolution in order to measure the width L of the jet and its position P with a reliability of 0.5 mm in ordinary applications and 0.1 mm in aeronautical applications. This means that the measurement should be repetitive and that they can detect differences of respectively 0.5 mm and 0.1 mm in the variations of the quantities being measured. The camera used here has a matrix of 640×480 pixels.

Reference will now be made to both FIGS. 1 and 6. The computer 100 is equipped with monitoring software which accesses the database 130 in order to perform the following functions:

Giving the control unit the initial values of the supply parameters when a depositing operation is being started.

Acquiring the images 112 coming from the CCD camera N times per second, and grouping them into batches of N1 images, and acquiring a temperature measurement 114 from the pyrometer at the end of each image batch.

For each image, calculating the jet characteristics being used, on the basis of the image pixels which are selected from a pixel row 154 transverse to the image of the jet 16a and whose light level nl is higher than that of the background image.

If x denotes the rank of the pixel along the pixel row 154, $P_0$ the position 14a of the geometrical axis 14 of the torch on the image 112, nl the light level of the pixels and n the number of pixels, then Imax, L and P can be calculated by the following formulae:

Imax=maximum (nl)
p=average of x=Σx.nl/Σnl−$P_0$

L=2× standard deviation=2σ=2.square root[Σ(x.nl)²/n−(P+$P_0$)²]

Imax, P and L preferably deduced from a Gaussian law established, for example, by the well-known so-called "least squares" method on the basis of the distribution of the light levels nl of the pixels along the row of pixels, this Gaussian law being of the form $I_{max} \cdot \exp(-(x-(P+P_0))^2/\sigma^2)/2\pi$ This is a preferred embodiment of the invention, in which the position P of the jet is estimated with respect to a reference position $P_0$ corresponding to the geometrical axis of the torch 12. It will be understood that any other estimate of P, calculated to within a constant value, will give the same result. It will be sufficient to change the constant term in the equation giving the spray characteristic P as a function of the supply parameters which have an effect on P.

For ease of expression, the use of the spray characteristics with a view to calculating new supply parameters and transmitting them to the control unit will be referred to as "processing". In this context, the computer 100 fulfills the following functions.

For each batch: verifying that the jet 16 is stabilized by verifying that the differences in the jet characteristics between the images of the batch are at most equal to the stability threshold level of the jet.

For each image batch relating to a jet 16 assessed as being stabilized:
  calculating the spray characteristics by averaging the measurements of Imax, L, P and by correcting the temperature T as a function of the emissivity of the surface being measured.
  Finding the most important spray characteristic which has drifted outside its predefined acceptable range, and determining and transmitting to the control unit 30 the supply parameter to be corrected as well as its new value, which are suitable for returning the spray characteristic to its acceptable range.
  Emitting a warning signal and transmitting a stop instruction to the control unit when it is not possible to return a spray parameter to its acceptable range without making all the supply parameter depart from their predefined normal operating ranges.
  When all the spray characteristics are each in their acceptable range: finding the most important spray characteristic lying outside its predefined optimum range, and determining and transmitting to the control unit the supply parameter to be corrected as well as its new value, which are suitable for returning the spray characteristic to its optimum range. For the sake of simplicity, and although it is not obligatory, the spray characteristics will be processed with the same orders of priority.

FIG. 7 gives an example of an algorithm for fulfilling these functions in a synthetic form. It is synthetic since it only gives the general logic of the monitoring and management of the operation of the torch, because the estimation of the spray characteristics, the choice of the spray characteristics and the corresponding supply parameters to be corrected, as well as the calculation of this correction, can be obtained by straightforward programming.

We will now study some numerical exemplary embodiments of the present invention. The torch employed is a thermal plasma spray torch with external injection and, more specifically, the model F4MB sold by the Swiss company whose corporate name is Sulzer Metco. In these examples, the torch is used in substantially common operating ranges, so that the same equations can be used.

The general information is as follows:

| Image acquisition frequency = N = | 100/second |
| Number of the images per batch = N1 = | 10 |
| Background noise level = | 5 |
| Jet stability level = | 1% |

It should be noted that the images and the temperature measurements are available directly at the ports of the computer in the installation which was produced by the Inventors.

The values of the spray characteristics $I_{max}$, P, L and T are given by the following equations:

$$Imax = -45.2957 - 1.51175*Ar + 38.2083*H_2 + 0.234739*I -$$
$$8.94*Ar_{carrier} - 0.39724*ArH_2 - 0.00272557*Ar*I +$$
$$1.04463*Ar*Ar_{carrier} + 0.0170028*H_2*I -$$
$$6.46563*H_2*Ar_{carrier} - 0.0231932*I*Ar_{carrier}$$

$$P = -7.85889 + 0.0795898*Ar - 0.0244141*H_2 +$$
$$0.00776811*I + 2.22168*Ar_{carrier} -$$
$$0.000712077*ArH_2 - 0.0000521573*Ar*I -$$
$$0.0266113*Ar*Ar_{carrier} - 0.000616599*H_2*I +$$
$$0.10376*H2*Ar_{carrier} - 0.000998757*I*Ar_{carrier}$$

$$L = 17.9632 - 0.30375*Ar - 0.377083*H_2 - 0.00725*I -$$
$$0.025*Ar_{carrier} + 0.0107292*Ar*H_2 + 0.000126136*Ar*I +$$
$$0.04675*Ar*Ar_{carrier} - 0.0000473485*H_2*I +$$
$$0.0395833*H_2*Ar_{carrier} + 0.00206818*I*Ar_{carrier}$$

$$T = -417.125 + 3.7875*Ar + 61.5625*H_2 + 0.729545*I +$$
$$51.25*Ar_{carrier} - 0.380208*Ar*H_2 - 0.00244318*Ar*I -$$
$$0.0625*Ar*Ar_{carrier} - 0.0260417*H_2*I -$$
$$6.77083*H_2*Ar_{carrier} - 0.0352273*I*Ar_{carrier}$$

In these equations:
I is expressed in amperes.
The gas flow rates Ar, $Ar_{carrier}$ and H2 are expressed in liters per minute normalized to atmospheric pressure.
The supply parameters have the same orders of priority in each equation, and are thus taken in the following order of decreasing priority: Ar, H2, I, $Ar_{carrier}$. This identity of the orders of priority is associated only with this torch and does not apply as a general rule.

In practice, the operation of the torch is limited only by the maximum dissipated power, namely 55 kW. If a safety margin of 10 kW is adopted, then the torch will no longer be used above 45 kw and the arc intensity will be conditioned by the following formula:

$I \leq 45000/V$

V being the voltage of the plasma arc as expressed in volts and given to the computer 100 by the control unit 30 via the connection 120 between the control unit 30 and the computer 100.

The minimum arc intensity, as well as the normal operating ranges of the other supply parameters, that is to say Ar, H$_2$, and $Ar_{carrier}$, correspond to the scopes in which these equations are valid.

For example:
If Imax needs to be reduced, then Ar will be increased by a value equal to its step size since the coefficient of Ar in this equation is negative and equal to −1.51175. But if Imax needs to be increased, conversely, then Ar will be reduced by a value equal to its step size.

If Ar comes out of its normal operating range and if Imax needs to be reduced, then H2 will be reduced by a value equal to its step size since the coefficient of H$_2$ in this equation is positive and equal to +38.2083. If Imax needs to be increased, conversely, then H2 will be increased by a value equal to its step size.

In a first numerical example, the deposit is CuNiIn (copper, nickel and Indium) and it needs to have an oxide level at most equal to 2%. Observations have shown that the level of oxides expressed as a percentage, that is to say a value ranging from 0% to 100%, is given by the following formula:

oxide level=$0.0163213*I_{max}+0.00778653*T$ with the variable $I_{max}$ having priority over the variable T, the model corresponding to this deposit therefore containing the aforementioned equations giving Imax and T.

The optimum ranges and the acceptable ranges of $I_{max}$ and T, each expressed by a minimum value and a maximum value, are as follows:

| Spray characteristics | Order of priority | Acceptable ranges min/max | Optimum ranges min/max |
|---|---|---|---|
| $I_{max}$ [0, 255] | 1 | 0/40 | 0/20 |
| T (° C.) | 2 | 190/280 | 190/220 |

The initial values of the supply parameters and the normal operating ranges, expressed in terms of a minimum/maximum value, are given by the following table:

| Supply parameters | Initial values | Operating ranges min/max | Correction step size |
|---|---|---|---|
| I (A) | 450 | 360/540 | ±10 |
| Ar (L/mn) | 45 | 36/54 | ±1 |
| H$_2$ (L/mn) | 15 | 12/18 | ±0.5 |
| $Ar_{carrier}$ (L/mn) | 2.5 | 2/3 | ±0.1 |

In a second numerical example, the deposit is to have a hardness at least equal to 120 Hv, this deposit being formed by using the aforementioned torch and deposit composition. Experiments have shown that the hardness expressed in Hv is given by the following formula:

Hardness=$8.4*L+5.2*I_{max}$

Since the variable L has the greatest effect, the operator will consequently use the following equation system in which L has priority over $I_{max}$:

$$L = 17.9632 - 0.30375*Ar - 0.377083*H_2 - 0.00725*I -$$
$$0.025*Ar_{carrier} + 0.0107292*Ar*H_2 + 0.000126136*Ar*I +$$
$$0.04675*Ar*Ar_{carrier} - 0.0000473485*H_2*I +$$
$$0.0395833*H_2*Ar_{carrier} + 0.00206818*I*Ar_{carrier}$$

-continued
$$I_{max} = -45.2957 - 1.51175*Ar + 38.2083*H_2 + 0.234739*I -$$
$$8.94*Ar_{carrier} - 0.39724*ArH_2 - 0.00272557*Ar*I +$$
$$1.04463*Ar*Ar_{carrier} + 0.0170028*H_2*I -$$
$$6.46563*H_2*Ar_{carrier} - 0.0231932*I*Ar_{carrier}$$

The optimum ranges and the acceptable ranges of L and $I_{max}$, expressed in terms of min/max values, are as follows:

| Spray characteristics | Order of priority | Acceptable ranges min/max | Optimum ranges min/max |
|---|---|---|---|
| L (mm) | 1 | 2/9.8 | 2/5 |
| $I_{max}$ [0, 255] | 2 | 20/180 | 20/100 |

The initial values of the supply parameters and the normal operating ranges, expressed in terms of a min/max value, are given by the following table:

| Supply parameters | Initial values | Operating ranges min/max | Correction step size |
|---|---|---|---|
| I (A) | 450 | 360/540 | ±10 |
| Ar (L/mn) | 45 | 36/54 | ±1 |
| $H_2$ (L/mn) | 15 | 12/18 | ±0.5 |
| $Ar_{carrier}$ (L/mn) | 2.5 | 2/3 | ±0.1 |

This third numerical example combines the two preceding examples, the deposit needing to have a level of oxides at most equal to 2% and a hardness at least equal to 120 Hv, this deposit being formed by using the aforementioned torch and deposit composition. Experiments have shown that the level of oxides expressed as a percentage, that is to say from 0% to 100%, and the hardness expressed in Hv are given by the following formula:

level of oxides=0.0163213*$I_{max}$+0.00778653*$T$

Hardness=8.4*$L$+5.2*$I_{max}$

Here, the operator uses the following system of equations in which Imax has priority over L and L has priority over T:

$$I_{max} = -45.2957 - 1.51175*Ar + 38.2083*H_2 + 0.234739*I -$$
$$8.94*Ar_{carrier} - 0.39724*ArH_2 - 0.00272557*Ar*I +$$
$$1.04463*Ar*Ar_{carrier} + 0.0170028*H_2*I -$$
$$6.4563*H_2*Ar_{carrier} - 0.0231932*I*Ar_{carrier}$$
$$L = 17.9632 - 0.30375*Ar - 0.377083*H_2 - 0.00725*I -$$
$$0.025*Ar_{carrier} + 0.0107292*Ar*H_2 + 0.000126136*Ar*I +$$
$$0.04675*Ar*Ar_{carrier} - 0.0000473485*H_2*I +$$
$$0.0395833*H_2*Ar_{carrier} + 0.002068118*I*Ar_{carrier}$$
$$T = -417.125 + 3.7875*Ar + 61.5625*H_2 + 0.729545*I +$$
$$51.25*Ar_{carrier} - 0.380208*Ar*H_2 - 0.00244318*Ar*I -$$
$$0.0625*Ar*Ar_{carrier} - 0.0260417*H_2*I -$$
$$6.77083*H_2*Ar_{carrier} - 0.0352273*I*Ar_{carrier}$$

The optimum ranges and the acceptable ranges of $I_{max}$, L and T, expressed in terms of min/max values, are as follows:

| Spray characteristics | Order of priority | Acceptable ranges min/max | Optimum ranges min/max |
|---|---|---|---|
| $I_{max}$ [0, 255] | 1 | 20/40 | 19/20 |
| L (mm) | 2 | 2/9.8 | 2/5 |
| T (° C.) | 3 | 190/280 | 190/220 |

The initial values of the supply parameters and the normal operating ranges, expressed in terms of a min/max value, are given by the following table:

| Supply parameters | Initial values | Operating ranges min/max | Correction step size |
|---|---|---|---|
| I (A) | 450 | 360/540 | 10 |
| Ar (L/mn) | 45 | 36/54 | 1 |
| $H_2$ (L/mn) | 15 | 12/18 | 0.5 |
| $Ar_{carrier}$ (L/mn) | 2.5 | 2/3 | 0.1 |

In a fifth numerical example, the residual stresses of the deposit are to be compressive and limited to −400 MPa (megapascal), this deposit being formed by using the aforementioned torch and deposit composition. Experiments have shown that the residual stress is given by the following formula:

Stress$_{Mpa}$=720.92−2.5342*$T$

The operator uses a single equation here, namely the one for T:

$$T = -417.125 + 3.7875*Ar + 61.5625*H_2 + 0.729545*I +$$
$$51.25*Ar_{carrier} - 0.3802008*Ar*H_2 - 0.00244318*Ar*I -$$
$$0.0625*Ar*Ar_{carrier} - 0.0260417*H_2*I -$$
$$6.77083*H_2*Ar_{carrier} - 0.0352273*I*Ar_{carrier}$$

The optimum ranges and the acceptable ranges of L and T, expressed in terms of min/max values, are as follows:

| Spray characteristics | Acceptable ranges min/max | Optimum ranges min/max |
|---|---|---|
| T (° C.) | 280/360° C. | 280/300° C. |

The initial values of the supply parameters and the normal operating ranges, expressed in terms of a min/max value, are given by the following table:

| Supply parameters | Initial values | Operating ranges min/max | Correction step size |
|---|---|---|---|
| I (A) | 450 | 360/540 | 10 |
| Ar (L/mn) | ??? | 36/54 | 1 |
| $H_2$ (L/mn) | ??? | 12/18 | 0.5 |
| $Ar_{carrier}$ (L/mn) | ??? | 2/3 | 0.1 |

A deposit without cracks is desired in a fourth numerical example, this deposit being formed by using the torch and a deposit pf WCCo (tungsten cobalt carbide). Experiments have shown that the number of cracks per mm² is given by the following formula:

Number of cracks=−0.22+0.5*P+0.00009*$I_{max}$

In this formula, a number of cracks less than zero means that there are no cracks.

Here, the operator uses the following system of equations in which P has priority Imax, P having a preponderant effect and $I_{max}$ having a secondary effect:

$$P = -7.85889 + 0.0795898*Ar -$$
$$0.0244141*H_2 + 0.00776811*I + 2.22168*Ar_{carrier} -$$
$$0.00712077*ArH_2 - 0.000521573*Ar*I -$$
$$0.0266113*Ar*Ar_{carrier} - 0.000616599*H_2*I +$$
$$0.10376*H_2*Ar_{carrier} - 0.000998757*I*Ar_{carrier}$$
$$I_{max} = -45.2957 - 1.51175*Ar + 38.2083*H_2 + 0.234739*I -$$
$$8.94*Ar_{carrier} - 0.39724*ArH_2 - 0.00272557*Ar*I +$$
$$1.04463*Ar*Ar_{carrier} + 0.0170028*H_2*I -$$
$$6.46563*H_2*Ar_{carrier} - 0.0231932*I*Ar_{carrier}$$

The optimum ranges and the acceptable ranges of P and $I_{max}$, expressed in terms of min/max values, are as follows:

| Spray characteristics | Order of priority | Acceptable ranges min/max | Optimum ranges min/max |
|---|---|---|---|
| P (mm) | 1 | −5/1.2 | −5/1 |
| $I_{max}$ [0, 255] | 2 | 20/100 | 20/50 |

The initial values of the supply parameters and the normal operating ranges, expressed in terms of a min/max value, are given by the following table:

| Supply parameters | Initial values | Operating ranges min/max | Correction step size |
|---|---|---|---|
| I (A) | 650 | 520/780 | 10 |
| Ar (L/mn) | 45 | 36/54 | 1 |
| $H_2$ (L/mn) | 120 | 96/144 | 0.5 |
| $Ar_{carrier}$ (L/mn) | 2.3 | 1.8/2.8 | 0.1 |

The invention thus makes it possible to guarantee a plurality of characteristics of the deposit simultaneously, if the ranges of spray characteristics established for each characteristic of the deposit overlap. If these ranges do not overlap, then it is necessary to increase them and tolerate a greater dispersion in some of the characteristics of the deposit.

The invention can be readily implemented with a commercially available microcomputer equipped with suitable interfaces for collecting the measurements of the spray characteristics and for transmitting new values of the supply parameters to the control unit. Other equivalent computing architectures are possible and do not depart from the scope of the invention. For example, the computing means may be those of a workstation shared by a plurality of machines. On the other hand, it is also possible to calculate the measurements on a first computer, for example one which is onboard with the sensors, and to carry out the processing operations on a second computer, for example one which is included in the control unit.

It will be understood that the invention may be applied to any type of thermal spray torch, since the measurements used for the management are carried out on the effects of the torch, in the case in point on the jet which it produces and on the temperature of the deposit.

It will also be understood that the software fulfilling the functions described and claimed in this patent application may be written in different ways with different algorithms, without the instrument departing from the scope of the invention.

It will also be understood that the proposed database is the preferred embodiment of the invention, but is not indispensable. For instance, a more rudimentary solution may also be envisaged which consists in entering the data necessary for a thermal spraying operation into the computer on each occasion.

The proposed example of an information system is simple and makes it possible to organize the information necessary for a thermal spraying operation. More elaborate models which limit the repetition of information may also be envisaged.

Sometimes, it may be necessary to attach the operating range, the correction step size or the order of priority to the equation/supply parameter relation, but the proposed examples do not require this.

It will also be understood that the sensors must be able to monitor the thermal spraying as it is being carried out. In the event that the torch is mobile, these sensors will advantageously be attached to the torch, although they may also monitor the movements of the torch by other means. The claims also cover the case of an installation in which the torch is fixed and the article to be coated moves in front of the torch.

The invention claimed is:

1. A thermal spray instrument (10) having a thermal spray torch (12), the torch (12) having a geometrical axis (14), the torch (12) being capable of spraying a jet (16) along its geometrical axis (14), the jet (16) consisting of a gas flow at elevated temperature loaded with molten particles of the material to be sprayed, the instrument (10) having a control unit (30) supplying the torch (12) with ingredients by applying the supply parameters (122) which are communicated to the control unit, the instrument (10) having a computer (100) communicating the supply parameters (122) to the control unit (30) by means of a unit-computer connection (120), the instrument (10) having sensors (52) capable of monitoring the movements of the torch (12), the sensors (52) being capable of transmitting information (112, 114) about the operation of the torch (12) to the computer (100), this transmission being carried out by means of the sensors-computer connection (100), characterized in that:

a. the computer (100) has software for realtime analysis of the information (112, 114), in order to repetitively deduce therefrom the measurement of at least one spray parameter to determine when this measurement is stabilized, in order to calculate a new supply parameter value (122) and transmit the new supply parameter to the control unit (30) when the measured value of the spray parameter is outside a preestablished acceptable range of values specific to the spray parameter being processed, this new value of the supply parameter being suitable for returning the spray parameter to its acceptable range, b. the sensors 52 also have an optical pyrometer (70) capable of remotely measuring thermal radiation at a surface of an article (22) to be coated, the article being positioned in front of the torch (12), wherein the pyrometer (70) has a narrow field and is positioned so that the field comes as close as possible to the jet (16) on the article (22), but without interfering with the jet (16), the pyrometer (70) also being capable of periodically transmitting a temperature measurement to the computer (100) by means of the sensors-computer connection (110), the temperature measurement transmitted to the computer being referenced (114); and c. the computer (100) is capable of correcting the temperature measurement (114) as a function of an emissivity coefficient of the coating (22), the corrected temperature measurement called deposit temperature T constituting the spray parameter.

2. The instrument as claimed in claim 1, characterized in that:

d. the sensors (52) have a camera (54) capable of periodically providing the computer (100) with the information (112, 114) in the form of digital images (112) of the jet (16) as seen in profile over a part of its length, e. the computer (100) also measures from the image (112) and processes the width L of the jet (16), L also constituting a spray parameter, an order of priority been defined in the processing of the spray parameters, the processing of the deposit temperature T being given priority however, the camera (54) being capable of the observing the jet (16) with a resolution at least equal to 0.5 mmm, L being proportional to the standard deviation of the distribution of the luminance of the jet (16) along a geometrical line (154) transverse to the jet (16), in order also to regulate the hardness of the coating (22).

3. The instrument as claimed in claim 1, characterized in that:

d. the sensors (52) have a camera (54) capable of periodically providing the computer (100) with the information (112, 114) in the form of digital images (112) of the jet (16) seen in profile over a part of its length, e. the computer (100) also measures from the image (112) and processes the position (P) of the jet (16), P also consistuting a spray parameter, an order of priority being defined in the processing of the spray parameters, the processing of the deposit temperature T being given the highest priority, the camera (54) being capable of observing the jet (16) with a resolution at least equal to 0.5 mmm, P being, to within a constant value $P_0$, the mean of the distribution of the luminance of the jet (16) along a geometrical line (154) transverse to the jet (16) so as to regulate the level of cracks of the coating (22).

4. The instrument as claimed in claim 1, characterized in that:

d. the sensors (52) have a camera (54) capable of periodically providing the computer (100) with the information (112, 114) in the form of digital images (112) of the jet (16) seen in profile over a part of its length, e. the computer (100) measures from the image (112) and processes the maximum intensity $I_{max}$ of the jet (16), $I_{max}$ also constituting a spray parameter, an order of priority being defined in the processing of the spray parameters, the processing of the deposit temperature T being given the highest priority.

5. The instrument as claimed in claim 1, characterized in that the computer is capable of emitting a warning signal when a spray parameter is outside its acceptable range and the computer cannot calculate a new supply parameter value without making the value of the supply parameter depart from a normal operating range preestablished for this supply parameter.

6. The instrument as claimed in claim 1, characterized in that the thermal spraying operation is interrupted when a spray parameter is outside its acceptable range and the computer (100) cannot calculate a new supply parameter value without making the value of the supply parameter depart from a normal operating range preestablished for this supply parameter.

7. The instrument as claimed in claim 1, characterized in that the computer (100) is capable of: identifying the situation according to which all the spray parameters being used are each in their preestablished acceptable range, in calculating a new supply parameter value (122) and transmitting it to the control unit (30) when a measured value of the spray parameter is outside a preestablished optimum range of values specific to the spray parameter being processed, this optimum range being included in the acceptable range, this new value of the supply parameter being suitable for returning the spray parameter to its optimum range.

8. The instrument as claimed in claim 1, characterized in that the camera (52) has a charge accumulation matrix.

9. The instrument as claimed in claim 1, characterized in that the camera is capable of providing images of the jet (112) with a resolution at least equal to 0.1 mm.

10. The instrument as claimed in claim 1, with a flame (17) emerging from the torch (12) in the vicinity of the apex of the cone formed by the jet (16), characterized in that the camera (54) is positioned in order to provide images (122) of the jet (16) downstream of the flame (17).

11. The instrument as claimed in claim 1, with the torch (12) having an injector (18) so as to spray powder, this injection taking place at the outlet of the torch (12) along a geometrical axis (20) substantially perpendicular to the geometrical axis of the torch (14), characterized in that the camera (54) is positioned in order to see the jet (16) along a geometrical axis (56) substantially orthogonal to the geometrical axis (20) of the injector (18).

12. The instrument as claimed in claim 1, characterized in that the luminance of the jet (16), as taken into account in the processing, is the light level of the pixels of the images (112).

13. The instrument as claimed in claim 1, characterized in that the computer (100) is capable of taking into account only the pixels of the images (112) whose light level is higher than a preestablished value.

14. The instrument as claimed in claim 1, characterized in that the maximum luminance Imax, the width L and the position P of the jet (16), as are processed by the computer (100), are averages over the images grouped in batches.

15. The instrument as claimed in claim 1, characterized in that at least one of the measurements taken from the images (112), namely the maximum luminance $I_{max}$, the width L and the position P of the jet (16), is deduced from a Gaussian law of the form $I_{max}\exp(-(x-(P+P_0))^2/\sigma^2)/2\pi$.

16. The instrument as claimed in claim 1, characterized in that the pyrometer 70 has a laser sight (74).

17. A method for controlling a thermal spray torch adapted to spray a jet consisting of gas flow at elevated temperatures with molten particles entrained therein, the jet being sprayed along a geometric axis of the torch and the torch being controlled by a control unit which supplies ingredients to the torch in accordance with supply parameters communicated to the control unit by a computer, said method comprising:

sensing information about the operation of the jet, the information sensed including surface temperature of an article positioned in front of the torch remotely measured at a location on the surface of the article as close as possible to the jet without interfering with the jet;

transmitting the sensed information to the computer;

repetitively calculating, with the computer and based on the sensed information, at least one spray parameter value of the jet for to generate a plurality of values for the spray parameter, the spray parameter comprising a deposit temperature calculated by correcting the surface temperature measurement as a function of the emissivity of a coating being applied to the surface of the article;

comparing the consecutive calculated spray parameter values to determine the difference between the consecutive spray parameter values;

determining that the spray parameter value has reach a stable state when the difference between consecutive spray parameter values is less than a stability threshold;

determining if the stable state spray parameter value is within a predefined acceptable range for the spray parameter;

if the stable state spray parameter value is outside the predefined acceptable range for the spray parameter, calculating with the computer a new supply parameter value for returning the spray parameter value back to the acceptable range for the spray parameter; and transmitting the new supply parameter value to the control unit, which, in turn, varies the ingredients supplied to the torch in accordance with the new supply parameter value to return the spray parameter value of the jet back to the predefined acceptable range for the spray parameter.

18. The method of claim 17, further comprising:

periodically generating digital images of a profile of the jet;

communicating the digital images to the computer, wherein a further spray parameter comprises the width L of the jet calculated by the computer from the digital images;

defining an order of priority in processing the spray parameters; and processing of the deposit temperature T of the jet as the highest priority.

19. The method of claim 17, further comprising:

periodically generating digital images of a profile of the jet;

communicating the digital images to the computer, wherein a further spray parameter comprises the position P of the jet calculated by the computer from the digital images as the mean distribution of the luminance of the jet along a geometrical line transverse to the jet to within a constant value $P_0$;

defining an order of priority in processing the spray parameters; and processing of the deposit temperature T of the jet as the highest priority.

20. The method of claim 17, further comprising:

periodically generating digital images of a profile of the jet;

communicating the digital images to the computer, wherein a further spray parameter comprises the maximum intensity $I_{max}$ of the jet calculated by the computer from the digital images;

defining an order of priority in processing the spray parameters; and processing of the deposit temperature T of the jet as the highest priority.

* * * * *